US010887826B2

(12) United States Patent
Cudak et al.

(10) Patent No.: US 10,887,826 B2
(45) Date of Patent: Jan. 5, 2021

(54) SIGNALING TO SUPPORT SCHEDULING IN AN INTEGRATED ACCESS AND BACKHAUL SYSTEM

(71) Applicant: Nokia Technologies Oy, Espoo (FI)

(72) Inventors: Mark Cudak, Rolling Meadows, IL (US); Anup Talukdar, Naperville, IL (US); Eugene Visotsky, Buffalo Grove, IL (US); Esa M. Malkamäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 50 days.

(21) Appl. No.: 16/406,938

(22) Filed: May 8, 2019

(65) Prior Publication Data

US 2019/0357117 A1     Nov. 21, 2019

Related U.S. Application Data

(60) Provisional application No. 62/672,911, filed on May 17, 2018.

(51) Int. Cl.
| | |
|---|---|
| *H04W 48/06* | (2009.01) |
| *H04W 80/02* | (2009.01) |
| *H04L 12/931* | (2013.01) |
| *H04W 72/12* | (2009.01) |

(52) U.S. Cl.
CPC .......... *H04W 48/06* (2013.01); *H04L 49/506* (2013.01); *H04W 72/1257* (2013.01); *H04W 80/02* (2013.01)

(58) Field of Classification Search
CPC ... H04L 49/505; H04L 49/506; H04W 92/045
See application file for complete search history.

(56) References Cited

U.S. PATENT DOCUMENTS

| | | | |
|---|---|---|---|
| 2015/0264707 A1 | 9/2015 | Golderer et al. | |
| 2016/0338087 A1* | 11/2016 | Ratasuk | ............ H04W 72/0413 |
| 2017/0064731 A1* | 3/2017 | Wang | ................ H04W 72/1263 |
| 2019/0297555 A1* | 9/2019 | Hampel | .................. H04L 47/29 |

OTHER PUBLICATIONS

"3rd Generation Partnership Project;Technical Specification Group Services and System Aspects;Service requirements for the 5G system; Stage 1 (Release 16)", 3GPP TS 22.261, V16.2.0, Dec. 2017, pp. 1-53.

(Continued)

*Primary Examiner* — Robert C Scheibel
(74) *Attorney, Agent, or Firm* — Nokia Technologies Oy

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: allocate a physical uplink channel between at least one integrated access and backhaul node user equipment function and a parent distributed unit; and send at least one message via the physical uplink channel, wherein the at least one message includes at least: a destination queue depth scheduled on a downlink by at least one integrated access and backhaul node distributed unit.

15 Claims, 6 Drawing Sheets

(56) References Cited

OTHER PUBLICATIONS

"New SID Proposal: Study on Integrated Access and Backhaul for NR", 8881123GPP TSG RAN Meeting #75, RP-170821, Agenda: 9.1, AT&T, Mar. 6-9, 2017, 5 pages.
Akyol et al., "Joint Scheduling and Congestion Control in Mobile Ad-Hoc Networks", IEEE INFOCOM 2008—The 27th Conference on Computer Communications, Apr. 13-18, 2008, p pages.
Baranda et al., "Backhaul Routing and Base Station Sleep Mode Engagement in Energy Harvesting Cellular Networks", ACM International Conference on Modeling, Analysis and Simulation of Wireless and Mobile Systems (MSWIM 2016), Nov. 2016, pp. 186-189.
Gomez-Cuba et al., "Optimal Link Scheduling in Millimeter Wave Multi-hop Networks with Space Division Multiple Access", 2016 Information Theory and Applications Workshop (ITA), Jan. 31-Feb. 5, 2016, 9 pages.
Kulkarni et al., "How Many Hops Can Self-backhauled Millimeter Wave Cellular Networks Support?", arXiv, May 4, 2018, pp. 1-15.
Nunez-Martinez et al., "A Self-organized Backpressure Routing Scheme for Dynamic Small Cell Deployments", Ad Hoc Networks, vol. 25, Part A, Feb. 2015, pp. 130-140.

\* cited by examiner

US 10,887,826 B2

SIGNALING TO SUPPORT SCHEDULING IN AN INTEGRATED ACCESS AND BACKHAUL SYSTEM

TECHNICAL FIELD

The teachings in accordance with the exemplary embodiments of this invention relate generally to Radio Standards including physical layer (PHY), Medium access control (MAC), Radio Link Control (RLC), Radio Resource Control (RRC), etc., and particularly, to radio physical layer design. More specifically, teachings in accordance with the exemplary embodiments relate to scheduling in an integrated access and backhaul system.

BACKGROUND

5G New Radio (NR) design have been implemented to allow network deployment with minimized manual efforts and as much automated self-configuration as possible. Particularly on higher frequency bands, coverage is known to be an issue and specific capabilities are required for NR to enable easy coverage extension with minimized/none requirements for network (re-)planning in a fast and cost-efficient manner. Mainly for these reasons, NR has the requirement to support wireless backhaul to connect relay nodes (also called Integrated Access and Backhaul, IAB nodes) with each other and to base stations with fixed connection. More specifically, NR is required to support self-backhauling where the same carrier is used for backhaul connection as well as for the access links, for example, enabling in-band backhaul operation.

Certain abbreviations that may be found in the description and/or in the Figures are herewith defined as follows:
BP: Backpressure
DCI Downlink Control Information
DL Downlink
DU Distributed Unit
IAB: Integrated Access and Backhaul
IAB UE (IAB node UE): UE function in an IAB node
IAB DU (IAB node DU): gNB DU function in a IAB node
gNB 5G Enhanced Node B (Base station)
HARQ Hybrid Automatic Repeat Request
LCID: Logical Channel identifier
LTE long term evolution
MAC Medium access control
MAC CE: MAC layer Control Element
MEC multi-access edge computing
MME mobility management entity
NCE network control element
NR New radio
NR-PDCCH New radio Physical Downlink Control Channel
N/W Network
PBCH Physical Broadcast Channel
PDCCH Physical Downlink Control Channel
PDSCH Physical Downlink Shared Channel
PUCCH Physical Uplink Control Channel
PUSCH Physical Uplink Shared Channel
RE Resource Element
RF Radio Frequency
RRC Radio Resource Control
UCI: Uplink Control Information
UE User Equipment
UL Uplink
5G Fifth generation mobile communication system

BRIEF SUMMARY

The following summary includes examples and is merely intended to be exemplary. The summary is not intended to limit the scope of the claims In accordance with one aspect, an example method comprises allocating a physical uplink channel between at least one integrated access and backhaul node user equipment function and a parent distributed unit, and sending at least one message via the physical uplink channel, wherein the at least one message includes at least a destination queue depth scheduled on a downlink by at least one integrated access and backhaul node distributed unit.

In accordance with another aspect, an example apparatus comprises means for allocating a physical uplink channel between at least one integrated access and backhaul node user equipment function and a parent distributed unit, and means for sending at least one message via the physical uplink channel, wherein the at least one message includes at least a destination queue depth scheduled on a downlink by at least one integrated access and backhaul node distributed unit.

In accordance with another aspect, an example apparatus comprises at least one processor; and at least one non-transitory memory including computer program code, the at least one memory and the computer program code may be configured to, with the at least one processor, cause the apparatus to allocate a physical uplink channel between at least one integrated access and backhaul node user equipment function and a parent distributed unit; and send at least one message via the physical uplink channel, wherein the at least one message includes at least: a destination queue depth scheduled on a downlink by at least one integrated access and backhaul node distributed unit.

In accordance with another aspect, an example apparatus comprises a non-transitory program storage device readable by a machine, tangibly embodying a program of instructions executable by the machine for performing operations, the operations comprising: allocating a physical uplink channel between at least one integrated access and backhaul node user equipment function and a parent distributed unit; and sending at least one message via the physical uplink channel, wherein the at least one message includes at least: a destination queue depth scheduled on a downlink by at least one integrated access and backhaul node distributed unit.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In the example embodiments as described herein a method and apparatus that provides multi-beam downlink channel control procedures.

Figure 1:
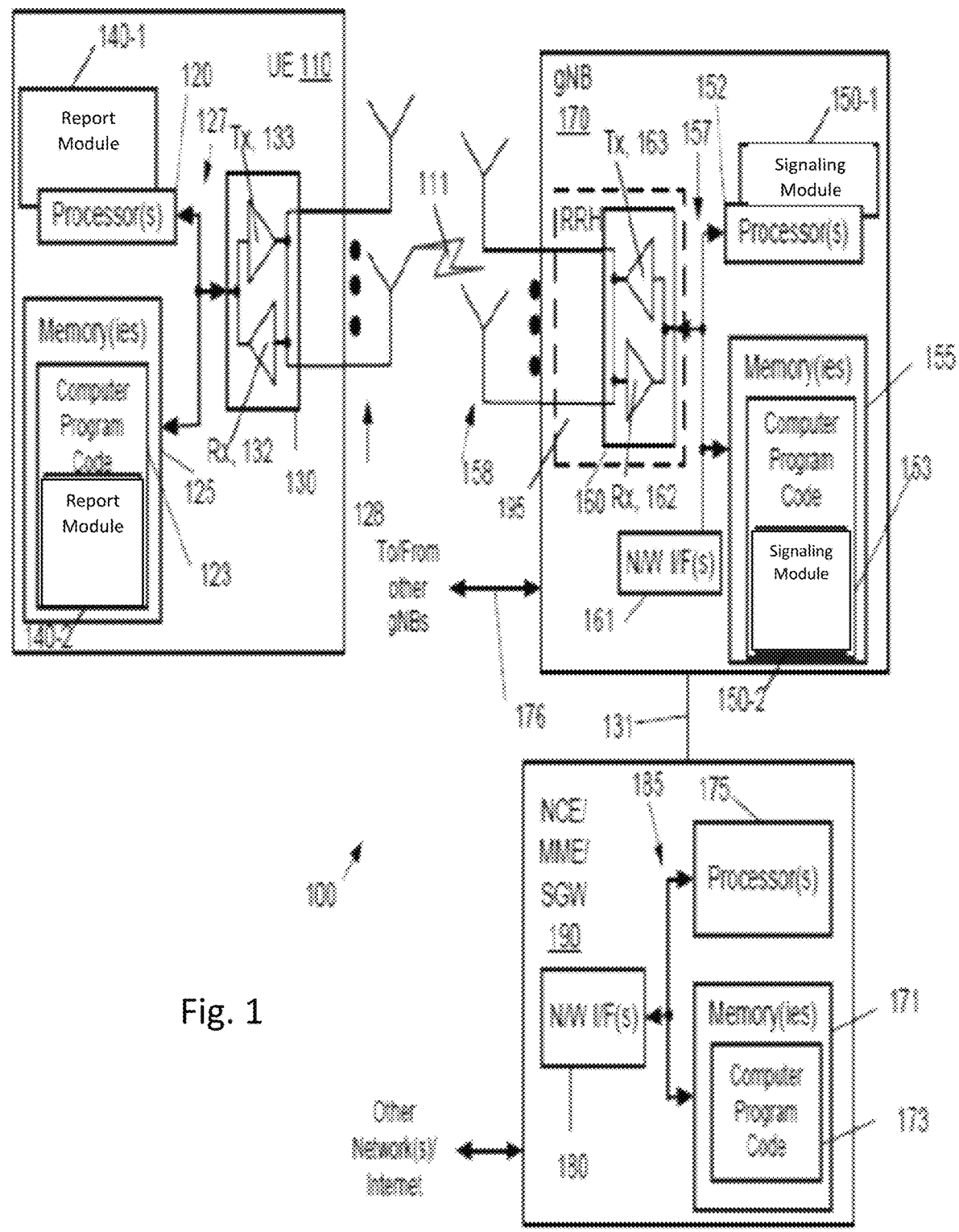
FIG. 1 is a block diagram of one possible and non-limiting example system in which the example embodiments may be practiced.

Turning to FIG. 1, this figure shows a block diagram of one possible and non-limiting example system in which the example embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a report module 140, comprising one of or both parts 140-1 and/or 140-2, which may be implemented in a number of ways. The report module 140 may be implemented in hardware as report module 140-1, such as being implemented as part of the one or more processors 120. The report module 140-1 may be implemented also as an integrated circuit or through other hardware such as a programmable gate array. In another example, the report module 140 may be implemented as report module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The gNB (NR/5G Node B but possibly an evolved NodeB) 170 is a base station (e.g., for LTE, long term evolution, or for NR, New Radio) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a signaling module 150, comprising one of or both parts 150-1 and/or 150-2, which may be implemented in a number of ways. The signaling module 150 may be implemented in hardware as signaling module 150-1, such as being implemented as part of the one or more processors 152. The signaling module 150-1 may be implemented also as an integrated circuit or through other hardware such as a programmable gate array. In another example, the signaling module 150 may be implemented as signaling module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB. Each cell may contain one or multiple transmission and receiving points (TRPs).

The wireless network 100 may include a network control element (NCE) 190 that may include MME (Mobility Management Entity)/SGW (Serving Gateway) functionality or AMF (Access Management Function)/UPF (User Plane Function)/SMF (Session Management Function), and which provides connectivity with a further network, such as a telephone network and/or a data communications network (e.g., the Internet). The gNB 170 is coupled via a link 131 to the NCE 190. The link 131 may be implemented as, for example, an 51 or NG interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Figure 4:
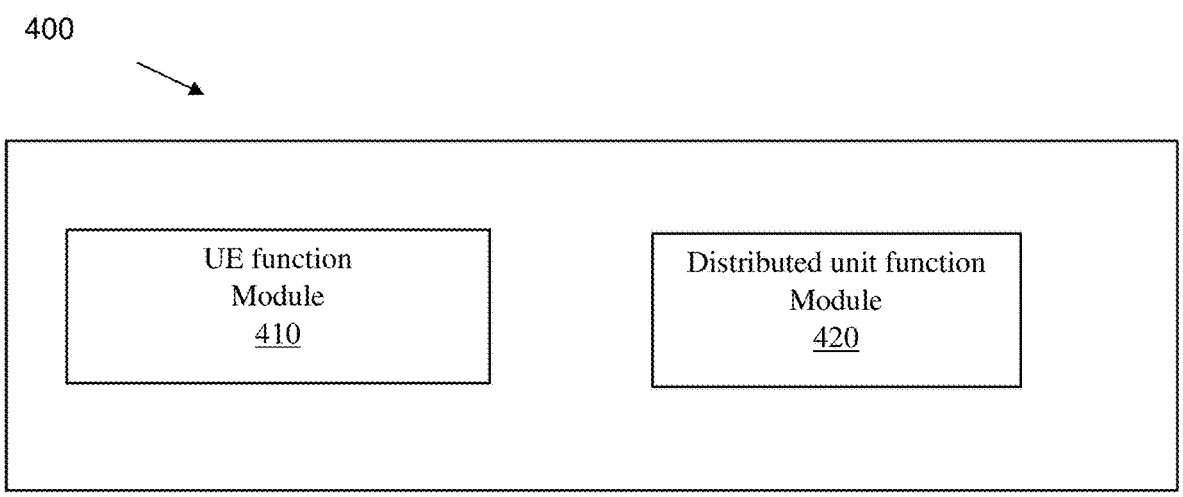
FIG. 4 is an example illustration of a block diagram of an IAB node.

In certain embodiments, for example as shown in FIG. 4, an IAB node, may include a UE part 410 which is similar to UE 110 for communication with the donor node or a parent IAB node's RAN part, in a multi-hop embodiment, and a RAN/DU part 420 which may be similar to a network entity/gNB 170 for communication with access UEs or a next hop IAB node UE part. In certain embodiments, therefore, a single IAB node may include at least two processors, at least two transceivers, at least two memories, and at least two antennas. In other embodiments the processors, transceivers, memories and/or antennas may be shared between the UE part and the RAN part of the IAB node.

Having thus introduced one suitable but non-limiting technical context for the practice of the example embodiments of this invention, the example embodiments will now be described with greater specificity.

Figure 2:
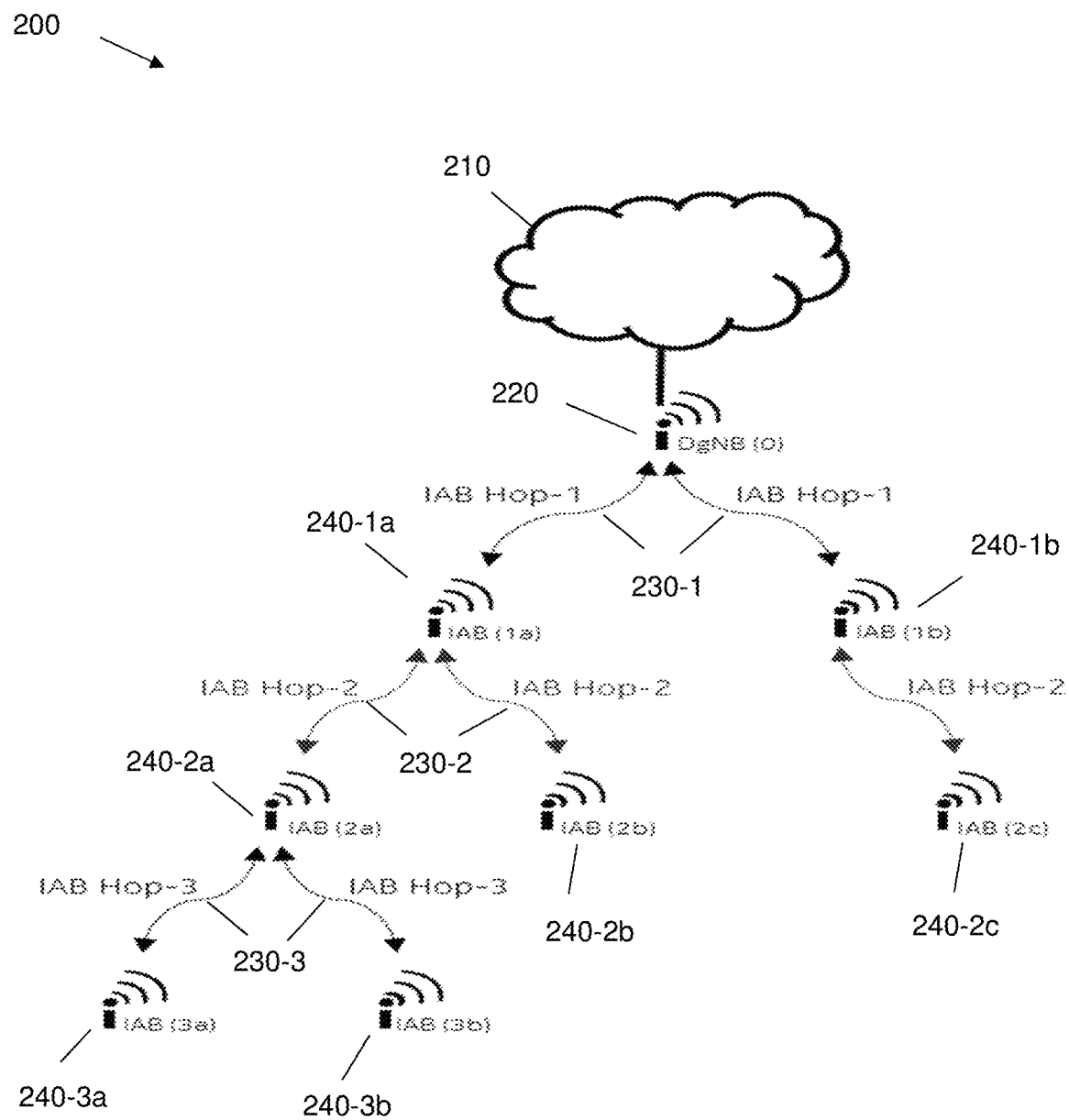
FIG. 2 shows an example illustration of an integrated access and backhaul tree showing connections between IAB nodes and Donor gNB.

FIG. 2 illustrates an example integrated access and backhaul tree 200 showing connections between IAB nodes 240 and donor gNB 220.

Service requirements for radio network systems (for example, 5G system) may have defined general requirements for wireless self-backhauling, such as those defined by service and systems aspect (SA1) in TS 22.261, section 6.12.2. Integrated Access and Backhaul (IAB node 240, a specific relaying node (RN), may have a wireless backhaul connection (instead of having a wired connection) to a donor gNB (DgNB) 220, a base station with fixed connection to the network backhaul. The serving DgNBs 220 may have the overall control of the usage of the radio resources considering both access and backhaul links. The DgNBs 220 may connect into the IAB network 200 (and to "cloud" 210, for example via a wireline connection).

The IAB network 200 may include the cloud 210 and the IAB tree. The IAB network 200 may be connected wirelessly with each IAB node 240 receiving service from a parent node and may provide service to the next hop IAB node 240, its child (for example, a dependent or subsequent node). For example, FIG. 2 illustrates a 3 hop (shown as IAB hop-1 (230-1), IAB hop-2 (230-2) and IAB hop-3 (230-3) IAB network in which IAB nodes (1a) 240-1a and (1b) 240-1b receive backhaul service from the parent donor gNB (0) 220; IAB nodes (2a) 240-2a and (2b) 240-2b receiving backhaul service from the parent IAB node (1a) 240-1a; IAB nodes (2c) 240-2c receiving backhaul service from the parent IAB node (1b) 240-1b; and IAB nodes (3a) 240-3a and (3b) 240-3b receiving service from the parent IAB node (2a) 240-2a.

The IAB network 200 may be required to schedule the wireless resources to meet the specific UE service requirement of each of the UEs 110 (not shown in FIG. 2) attached to the network. The UE service requirements may be independent of where the UE 110 is attached to the network regardless of whether they are attached to the donor gNB, first hop IAB node 240-1, $2^{nd}$ hop IAB node 240-2 or $3^{rd}$ hop IAB node 240-3. UE 110 service requirements may consume both backhaul and access wireless resources which are shared. In 3GPP NR, the wireless scheduling function may be performed in the MAC layer which may reside in the DU of each IAB node 240 and donor gNB 220.

The UE function and DU function in an IAB node 240 may share a transceiver. Furthermore, there may also be half-duplex constraints. An IAB node 240 UE scheduled by a parent DU for backhaul traffic may pre-empt access traffic scheduled by the IAB node DU and set the half-duplex constraint for other transceivers in the DU serving other sectors.

The example embodiments disclosed herein address transceiver contention for backhaul and access traffic while simultaneously meeting the UE service requirements for all UEs 110 attached to the IAB network.

Figure 3:
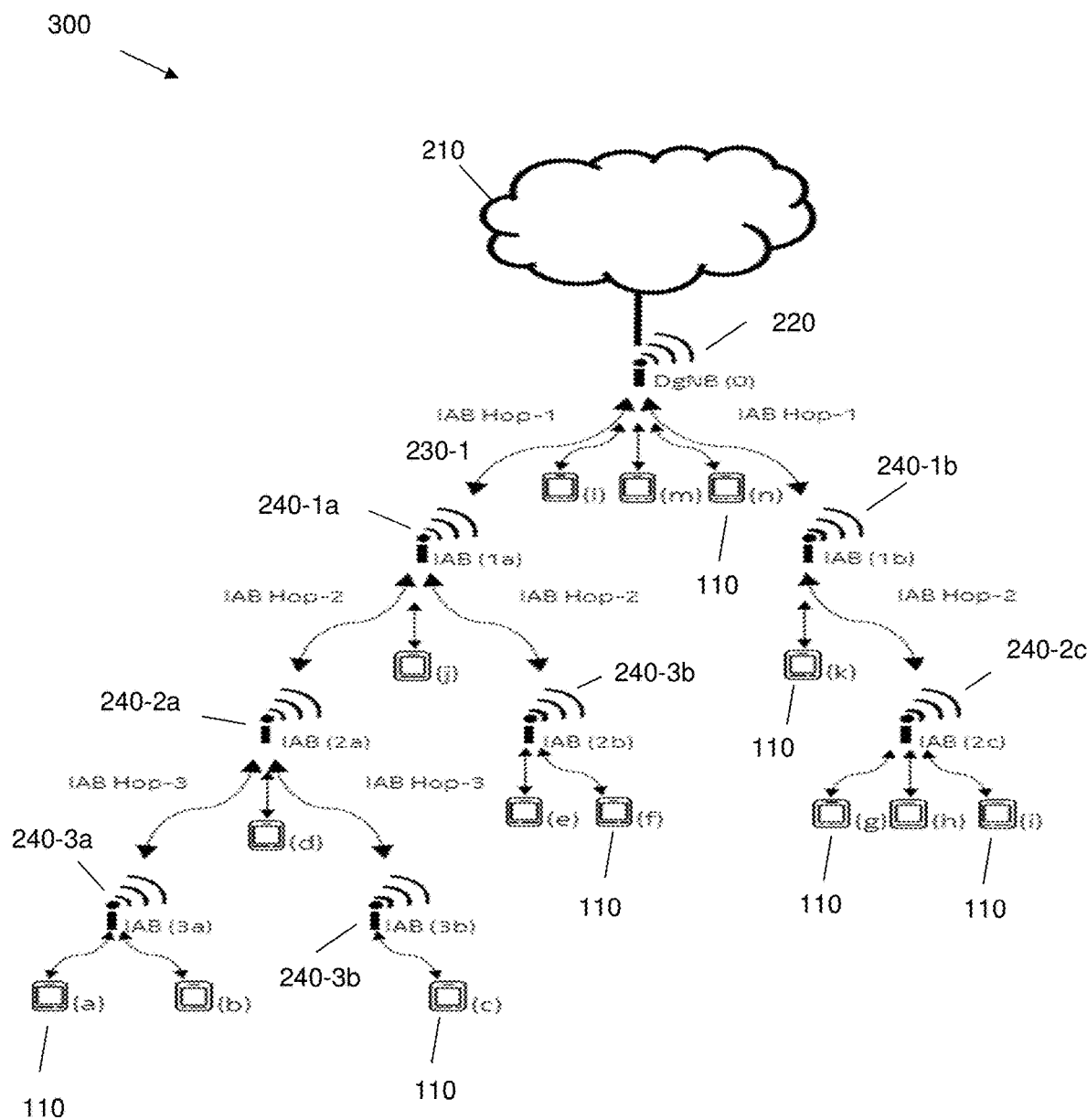
FIG. 3 shows an example illustration of UEs attached to the IAB Network.

Referring now to FIG. 3, as shown with respect to configuration 300, IAB network 200 may provide wireless access to a plurality of UEs 110, where each UE 110 may connect directly to a donor gNB 220 or an IAB node 240.

FIG. 3 illustrates the connection of 14 UEs 110, lettered (a) through (n), which are connected to the IAB network 210 at various IAB nodes 240 or directly to the donor gNB 220.

The donor gNB 220 and IAB nodes 240 may be required to share the wireless resource between backhaul and access. The resources may include wireless spectrum and wireless transceivers. These wireless resources may be time, frequency and/or spatially multiplexed.

The IAB node 240 may be composed of both an IAB UE function 410 for communicating with the parent node for backhaul service and an IAB gNB Distributed Unit (DU) function 420, as described below with respect to FIG. 4, for providing wireless access for both UEs 110 and child (next hop) IAB nodes 240.

The parent DU function located in either the donor gNB 220 or in the parent IAB nodes may schedule both downlink and uplink access traffic along with the outbound and inbound backhaul traffic for the attached UEs 110 and IAB node 240 UEs, respectively. IAB UE function 410 and IAB DU function 420 may be assumed to share a common transceiver preventing the IAB node 240 DU 420 from utilizing the transceiver for access traffic or child backhaul traffic when the IAB node 240 UE 410 is scheduled for parent backhaul traffic.

The IAB node 240 may further contain multiple sectors with multiple DU functions 420 for each respective cell served by each sector. A further half-duplex constraint may be imposed such that all sectors may be either be transmitting or receiving, where the transceivers transmit function may serve outbound backhaul traffic or downlink access traffic and the receive function may serve inbound backhaul traffic and uplink UE 110 traffic.

For multi-hop IAB scheduling, feedback of destination congestion status (for example, DL destination queue depth or per UE flow queue depth) may be required in order to calculate the scheduling metric in the source node and feedback of next hop node BP metric (per flow or per IAB node 240 DU or per IAB node 240) in order to decide whether the link is used for backhaul or access. The example embodiments may provide signalling for the network (for example, 3GPP NR) that may enable a donor gNB 220 or IAB node 240 DU to implement a backpressure scheduler based on per UE 110 queue information. For the example embodiments described herein, the donor gNB 220 DU and the parent IAB node 240 DU may be referred to as parent DU. In contrast to network scheduling arrangements which utilize back pressure in a peer-to-peer network, the example embodiments may be targeted to networks (such as 3GPP NR IAB) which differs in that, the uplink and downlink scheduling are both executed in the parent DU. Furthermore, the example embodiments may assume a scheduling pre-emption metric.

The scheduling pre-emption metric may provide an indication of the priority of traffic pending at the child IAB node. The pre-emption metric may allow the parent IAB node to determine if it should defer scheduling backhaul traffic so that the child node may be free to schedule access traffic or backhaul traffic to the next hop IAB node (child of the child in this case). The scheduling pre-emption metric may be composed of the maximum IAB scheduling metric and associated direction at the child IAB DU. The scheduling pre-emption metric may contain the per UE flow scheduling metrics and associated directions for the child IAB DU (next hop). Alternatively, the scheduling pre-emption metric may be an abbreviated metric such that it contains a course quantized scheduling priority and associated direction of the child IAB node. The scheduling pre-emption metric may further contain information that enumerates the per cell scheduling metrics for all DUs contained in the child IAB node.

According to example embodiments disclosed herein, donor gNB 220 or IAB node 240 DU may allocate a PUCCH, which may be a persistent PUCCH allocation, between the IAB node UE function and its parent DU. This PUCCH may be used to send messages containing per UE 110 flow queue depth, backpressure metric of the DL and UL UE 110 flows scheduled by the IAB node DUs, backpressure metrics received by the IAB node 240 DUs from the IAB UEs, and a link direction associated with the backpressure metrics sent.

The backpressure metric may be standardized and an example calculation may be determined as described in Eqn (1), in which the priority per flow per link is the backpressure metric (for example, B_link^f).

$$B_{link}^f = (Q_{SRC(link)}^f - Q_{DN(link)}^f) R_{link}, \text{ where}$$

$R_{link}$ is the instantaneous expected rate $Q_i^f$ is the queue size of node i for flow f.

An urgency weight based on the per-destination queues at the sending transceiver and the next hop transceiver may be combined with the rate of the next hop link. This may be referred to as a backpressure scheduler and may offer (for example, desirable improved) stability performance in a multi-hop network. Eqn 1 describes a formulation of the "urgency weight" or "backpressure metric" per flow.

The per UE 110 flow queue depth of the flows scheduled on the downlink by the IAB node 240 DUs (which may be equal to $Q_{DN(Link)}^f$ in Eqn 1) may be sent by the IAB node 240 UE to its parent. The backpressure metric of the DL and UL UE 110 flows scheduled by the IAB node 240 DUs may be sent by the IAB node 240 UE to its parent. For instance, IAB (1a) 240-1a may provide at least one backpressure metric to donor gNB(0) 220 for the flows of the UEs 110 (UE 110a, b, c, d, e, f, and j in FIG. 3). The backpressure metrics may be received by the IAB node 240 DUs from the IAB UEs of their child IAB nodes 240. The message may also include a link direction associated with the backpressure metrics sent.

According to an example embodiment, a parent DU receiving the message may use the information to determine whether the link is allocated for access or backhaul. According to example embodiments, only the maximum back pressure metric may be sent by the IAB node 240 UE function. According to example embodiments, the system may use only maximum back pressure metrics for both the downlink and uplink traffic served by the DU. According to example embodiments, the system may use a metric of all DUs at the IAB node 240 in a manner that addresses allowing high priority traffic to leave the IAB node given a half-duplex constraint.

Scheduling Metric

The per UE downlink flow queue depth and the backpressure metric (BP metric) may together constitute an IAB scheduling metric. The IAB scheduling metric may include a multi-hop scheduling metric, a backhaul scheduling metric, etc. The per UE flow downlink queue depth may contain the following attributes. UE_id: UE identifier. Flow_id: identifies the flow of the UE. DL_queue_depth: size of DL queue at the IAB DU for the flow Flow_id of the UE UE_id.

According to example embodiments, the system may use any of multiple BP metric reporting methods. The particular BP metric reporting scheme may be configured by higher layer signalling. In an example embodiment, per UE flow IAB scheduling metric (for example, backpressure metric)

may be used to facilitate per UE 110 flow level scheduling granularity. The message signalling the IAB scheduling metric (for example, a backpressure metric) may contain the following attributes. IAB_DU_id: IAB node DU identifier. UE_id: UE identifier. Flow_id: identifies the flow in the UE 110. Direction: indicates downlink or uplink flow. BP_value: backpressure value.

In further example embodiments, instead of per UE 110 flow metric, maximum backpressure metrics of the flows in an IAB node may be used to determine the backhaul links to be scheduled. In this instance, after the backhaul link schedules are determined, IAB nodes 240 may independently determine the specific flow(s) to be scheduled on its downstream links. The system may employ multiple different methods for reporting the maximum backpressure metrics.

In an example embodiment the reporting method may be based on a max-BP-DU metric. The maximum BP metric (over both downlink and uplink flows) for each DU in the IAB node may be sent by the IAB Node 240 UE function 410. The report may contain a set of BP metrics, for example, at most one for each DU in the node. The attributes in the metric may be: IAB_DU_id (for example, the IAB node DU identifier), direction (may indicate downlink or uplink flow) and BP_value: backpressure value.

In an example embodiment the reporting method may be based on a max-BP-DU-Directed metric. For each DU in the IAB node 240, the maximum BP metric of all DL flows and the maximum BP metric of all UL flows may be sent. The report may contain two BP metrics for each DU, one for DL flows and one for UL flow. The attributes in the metric may be: IAB_DU_id: the IAB node DU identifier having the maximum BP_value. Direction: indicates downlink or uplink flow. BP_value: backpressure value.

In an example embodiment the reporting method may be based on a max-BP metric. The maximum BP metric (over both downlink and uplink flows) of all the DUs in the IAB node may be sent by the IAB Node 240 UE function 410. The report may contain a single BP metric. The attributes in the metric may be: IAB_id: the IAB node identifier. Direction: indicates downlink or uplink flow. BP_value: backpressure value.

In an example embodiment the reporting method may be based on a max-BP-Directed metric. The maximum BP metric of all DL flows over all DUs and the maximum BP metric of all UL flows over all DUs in the IAB node may be sent by the IAB node UE 410. The report may contain two BP metrics, one for DL flows and another for UL flows. The attributes in the metric may be. IAB_id: the IAB node identifier. Direction: indicates downlink or uplink flow. BP_value: backpressure value.

Transport of Scheduling Metrics

With regard to transport of scheduling metrics, the scheduling metric may be defined as a UCI parameter for radio networks (for example a new UCI for 3GPP NR). There system may select from two options to transport the scheduling metrics described hereinabove, the physical (PHY) layer, and the MAC layer.

PHY Layer Transport

With regard to PHY layer transport, the scheduling metric may be defined as a type of UCI which can be transported on the PUCCH or PUSCH as physical layer signals.

With regard to scheduling metric reporting over PUCCH, each IAB Node UE function 410 may be configured with a PUCCH resource by higher layer signalling. For periodic scheduling metric reporting, a persistent allocation of PUCCH resource may be used. Alternatively, the PUCCH resource allocation may be performed by the DCI. Therefore, the PUCCH resource allocation for scheduling metric reports may contain parameters for PUCCH resource and scheduling metric reporting periodicity.

The PUCCH resource allocated may be determined based on the methods for reporting the BP metric as described herein above with regard to scheduling metric. For per UE 110 flow reporting, the number of active UE 110 flows in the IAB may also be used to estimate the PUCCH resource allocation. The scheduling metric reports may be multiplexed with other UCI types such as scheduling request (SR), HARQ-ACK, channel state information (CSI), etc.

With regard to scheduling metric reporting over PUSCH, the scheduling metric reports may be multiplexed in a PUSCH. The offset values for this multiplexing of scheduling metric may be signalled to the IAB node UE function 410 either by a DCI format scheduling the PUSCH or by higher layers.

MAC Layer Transport

With regard to MAC layer transport, the scheduling metric may be sent over PUSCH as MAC Control Element. The system may define logical channel IDs (LCIDs) such as DL_queue_depth and BP_metric.

DL_queue_depth may be used to send the size of the downlink queue for a UE 110 flow at the IAB node 240 DU 420. A single MAC CE may contain the downlink queue sizes for a finite number of UE 110 flows. The attributes for each flow may be as described above herein with regard to the scheduling metric. BP_metric may be used to send the backpressure metric of one or more UE 110 flows of the IAB node 240 DUs. The type of the metric and its attributes may be determined by BP metric configuration (as described above herein with regard to the scheduling metric). In a single MAC CE a (for example, finite) number of backpressure metrics may be carried.

FIG. 4 is an example illustration of a block diagram of an IAB node 240.

As shown in FIG. 4, the IAB node 240 may include a UE function module 410 and a distributed unit function module 420. The IAB node 240 may be composed of both an IAB UE function 410 for communicating with the parent node for backhaul service and an IAB gNB Distributed Unit (DU) function 420 for providing wireless access for both UEs 110 and child (next hop) IAB nodes 240, as described with respect to FIG. 2.

Figure 5:
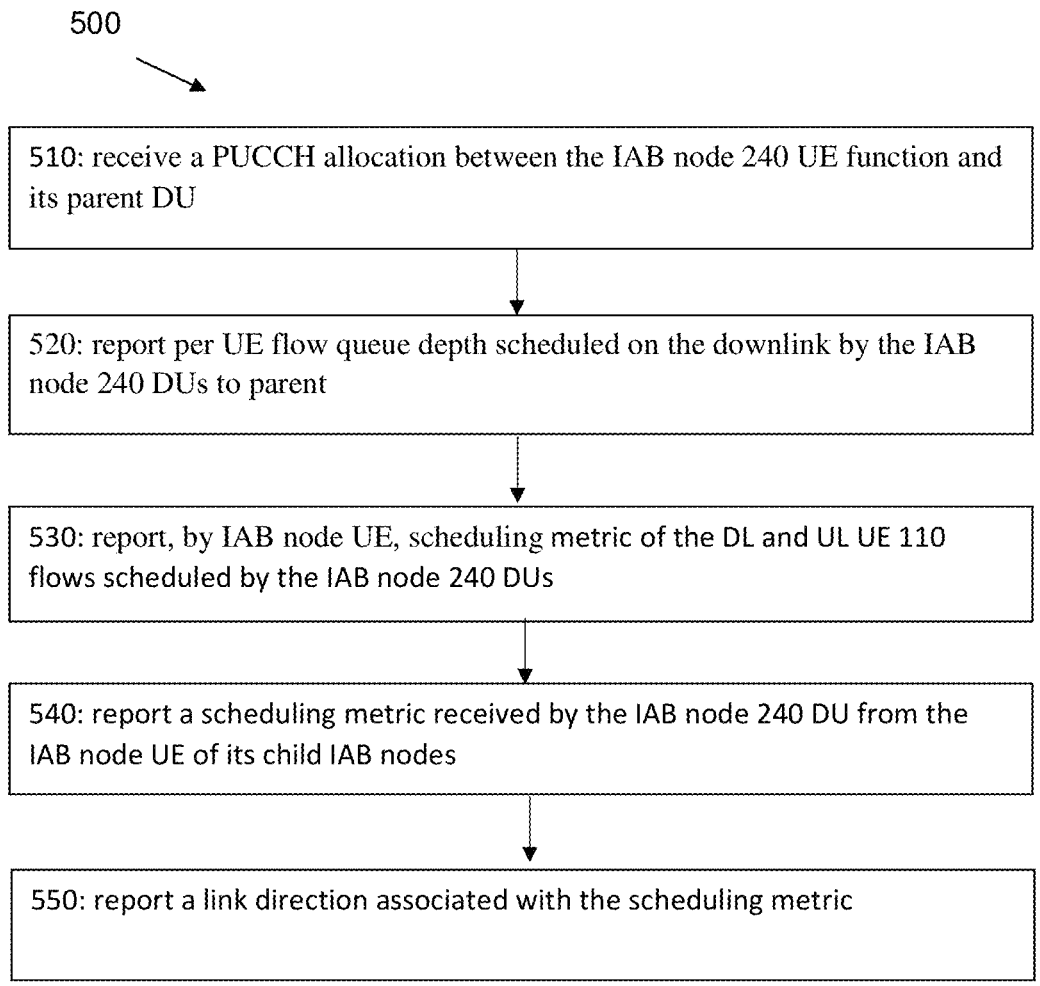
FIG. 5 shows a method in accordance with example embodiments which may be performed by an apparatus.

FIG. 5 is an example flow diagram 500 illustrating a method in accordance with example embodiments which may be performed by an apparatus.

At block 510, the IAB node 240 UE 410 may receive a PUCCH allocation. The PUCCH may be a persistent PUCCH allocation, between the IAB node 240 UE function and its parent DU (for example, the parent IAB node 240 DU or donor gNB 220). Alternatively, messages may be sent via PUSCH, for example as physical layer signaling (UCI) or MAC layer signaling (MAC CE).

At block 520, per UE flow queue depth of the flows scheduled on the downlink by the IAB node 240 DUs may be reported by the IAB node 240 UE to its parent.

At block 530, a scheduling (for example, backpressure) metric of the DL and UL UE 110 flows scheduled by the IAB node 240 DUs may be reported by the IAB node UE.

At block 540, a scheduling (for example, backpressure) metric received by the IAB node 240 DUs from the IAB Node UEs—of their child IAB nodes may be reported. For example, with respect to FIG. 3 described herein above, the IAB 240-2a may report to its parent 240-1a the scheduling metrics it received from its children 240-3a and 240-3b. The scheduling metrics (backpressure metrics) may be delivered hop-by-hop.

At block 550, a link direction associated with the backpressure metrics may be sent. The IAB node UE sending the backpressure metric for a flow may also send the link direction of that flow (downlink or uplink) to its parent IAB node (DU). For example, the link direction may be uplink or downlink.

The messages may include the downlink queue depth, backpressure value, IAB node identification and link direction associated with the backpressure value. The messages may be sent between parent and child nodes. The uplink channel allocation may be performed for the child node (by the DU function of the IAB node). The messages containing the queue depths and scheduling metrics may be sent to the parent node by the UE function of the IAB node.

Figure 6:
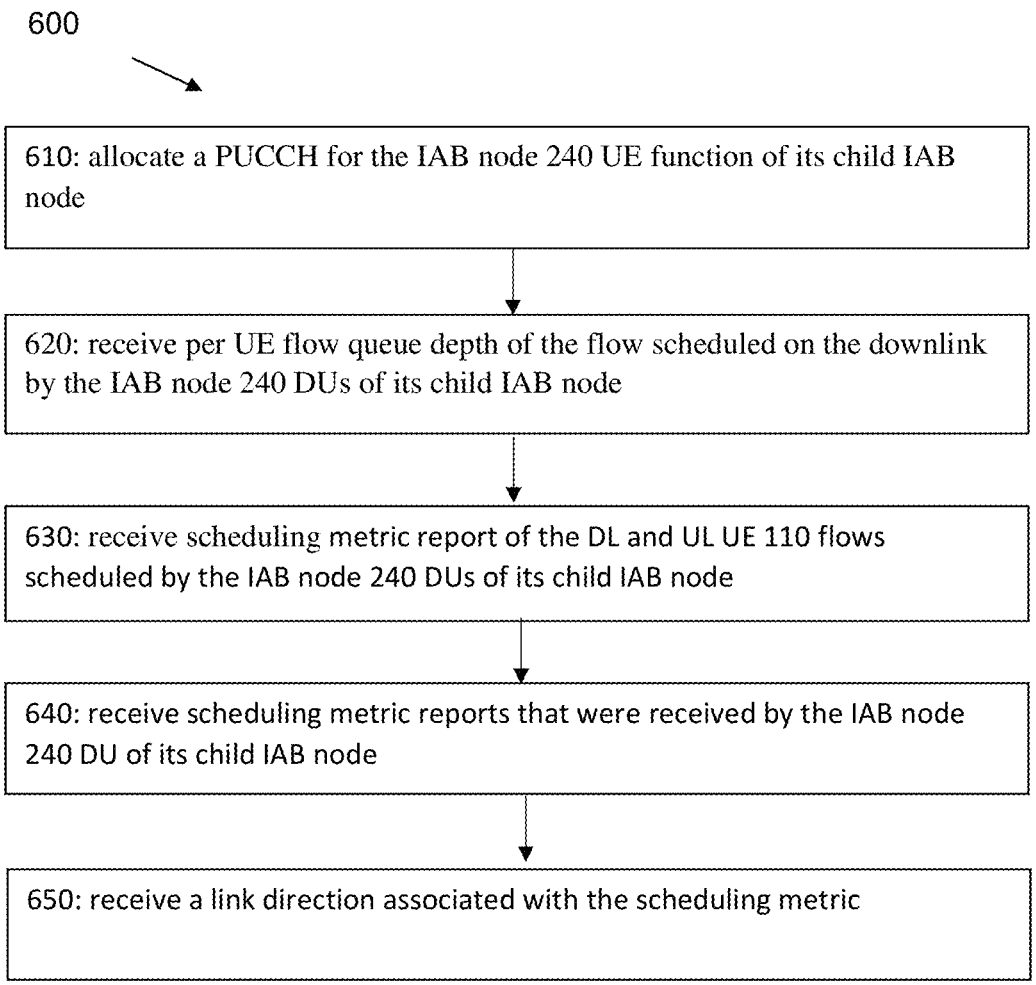
FIG. 6 shows another method in accordance with example embodiments which may be performed by an apparatus.

FIG. 6 is an example flow diagram 600 illustrating a method in accordance with example embodiments which may be performed by an apparatus.

At block 610, the IAB node 240 DU 420 may allocate a PUCCH for the IAB node 240 UE function of its child IAB node.

At block 620, the IAB node 240 DU 420 may receive per UE flow queue depth of the flow scheduled on the downlink by the IAB node 240 DUs of its child IAB node.

At block 630, the IAB node 240 DU 420 may receive scheduling metric report of the DL and UL UE 110 flows scheduled by the IAB node 240 DUs of its child IAB node.

At block 640, the IAB node 240 DU 420 may receive scheduling metric reports that were received by the IAB node 240 DU of its child IAB node.

At block 650, the IAB node 240 DU 420 may receive a link direction associated with the scheduling metric.

Without in any way limiting the scope, interpretation, or application of the claims appearing below, a technical effect of one or more of the example embodiments disclosed herein is to enable optimal multi-hop scheduling in IAB tree. Another technical effect enables joint scheduling and flow control in IAB tree. The terms IAB UE, IAB node UE, IAB node UE function, IAB node UE part, IAB UE function, integrated access and backhaul user equipment, integrated access and backhaul user equipment function are used in this application and all mean the same thing unless explicitly stated.

An example embodiment may provide a method comprising allocating a physical uplink control channel between at least one integrated access and backhaul node user equipment function and a parent distributed unit, and sending at least one message via the physical uplink control channel, wherein the at least one message includes at least a destination queue depth scheduled on a downlink by at least one integrated access and backhaul node distributed unit.

In accordance with the example embodiments as described in the paragraphs above, wherein the at least one message includes at least one scheduling metric.

In accordance with the example embodiments as described in the paragraphs above, wherein the at least one scheduling metric comprises at least one of a backpressure metric of the downlink and uplink user equipment flows scheduled by the at least one integrated access and backhaul node distributed unit; and a backpressure metric received by the at least one integrated access and backhaul node distributed unit from the integrated access and backhaul user equipment of at least one child integrated access and backhaul node.

In accordance with the example embodiments as described in the paragraphs above, wherein the at least one scheduling metric includes only a maximum back pressure metric for both downlink and uplink traffic served by a particular distributed unit.

In accordance with the example embodiments as described in the paragraphs above, determining whether a link is used for backhaul or access based on the at least one scheduling metric.

In accordance with the example embodiments as described in the paragraphs above, wherein the at least one scheduling metric is one of per flow, per integrated access and backhaul node distributed unit, or per integrated access and backhaul node.

In accordance with the example embodiments as described in the paragraphs above, implementing a backpressure scheduler based on per user equipment queue information.

In accordance with the example embodiments as described in the paragraphs above, wherein uplink and downlink scheduling are both executed in a parent distributed unit.

In accordance with the example embodiments as described in the paragraphs above, wherein sending the at least one message further comprises: sending the at least one message based on a scheduling pre-emption metric.

In accordance with the example embodiments as described in the paragraphs above, wherein the at least one message further includes a link direction associated with the at least one scheduling metric.

In accordance with the example embodiments as described in the paragraphs above, wherein the destination queue depth is a per UE flow queue depth.

An example embodiment may provide an apparatus comprising, means for allocating a physical uplink channel between at least one integrated access and backhaul node user equipment function and a parent distributed unit; and means for sending at least one message via the physical uplink channel, wherein the at least one message includes at least: a destination queue depth scheduled on a downlink by at least one integrated access and backhaul node distributed unit.

In accordance with the example embodiments as described in the paragraphs above, wherein the at least one message includes at least one scheduling metric.

In accordance with the example embodiments as described in the paragraphs above, wherein the at least one scheduling metric comprises at least one of: a backpressure metric of the downlink and uplink user equipment flows scheduled by the at least one integrated access and backhaul node distributed unit; and a backpressure metric received by the at least one integrated access and backhaul node distributed unit from the integrated access and backhaul user equipment of at least one child integrated access and backhaul node.

In accordance with the example embodiments as described in the paragraphs above, wherein the at least one scheduling metric includes only a maximum back pressure metric for both downlink and uplink traffic served by a particular distributed unit.

In accordance with the example embodiments as described in the paragraphs above, means for determining whether a link is used for backhaul or access based on the at least one scheduling metric.

In accordance with the example embodiments as described in the paragraphs above, means for implementing a backpressure scheduler based on per user equipment queue information.

In accordance with the example embodiments as described in the paragraphs above, wherein uplink and downlink scheduling are both executed in a parent distributed unit In accordance with another example, an example apparatus comprises: means for allocating a physical uplink control channel between at least one integrated access and backhaul node user equipment function and a parent distributed unit, and means for sending at least one message via the physical uplink control channel, wherein the at least one message includes at least a destination queue depth scheduled on a downlink by at least one integrated access and backhaul node distributed unit.

An example embodiment may be provided in an apparatus comprising at least one processor; and at least one non-transitory memory including computer program code, the at least one memory and the computer program code may be configured to, with the at least one processor, cause the apparatus to: allocate a physical uplink control channel between at least one integrated access and backhaul node user equipment function and a parent distributed unit; and send at least one message via the physical uplink control channel, wherein the at least one message includes at least: a destination queue depth scheduled on a downlink by at least one integrated access and backhaul node distributed unit.

In accordance with the example embodiments as described in the paragraphs above, wherein the at least one message includes at least one scheduling metric.

In accordance with the example embodiments as described in the paragraphs above, wherein the at least one scheduling metric comprises at least one of: a backpressure metric of at least one uplink user equipment flow scheduled by the at least one integrated access and backhaul node distributed unit; and a backpressure metric received by the at least one integrated access and backhaul node distributed unit from the integrated access and backhaul user equipment function of at least one child integrated access and backhaul node.

In accordance with the example embodiments as described in the paragraphs above, wherein the at least one scheduling metric includes only a maximum back pressure metric for both downlink and uplink traffic served by a particular distributed unit.

In accordance with the example embodiments as described in the paragraphs above, determine whether a link is used for backhaul or access based on the at least one scheduling metric In accordance with the example embodiments as described in the paragraphs above, implement a backpressure scheduler based on per user equipment queue information In accordance with the example embodiments as described in the paragraphs above, wherein uplink and downlink scheduling are both executed in a parent distributed unit.

In accordance with the example embodiments as described in the paragraphs above, wherein, when sending the at least one message, the at least one processor is further configured to send the at least one message based on a scheduling pre-emption metric Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
    receiving an allocation of a physical uplink channel between at least one integrated access and backhaul node user equipment function and a parent distributed unit; and
    sending at least one message via the physical uplink channel, wherein the at least one message includes at least one scheduling metric comprising:
    a destination queue depth scheduled on a downlink by at least one integrated access and backhaul node distributed unit,
    a backpressure metric of at least one user equipment flow scheduled by the at least one integrated access and backhaul node distributed unit,
    a backpressure metric received by the at least one integrated access and backhaul node distributed unit from at least one integrated access and backhaul user equipment function of at least one child integrated access and backhaul node, and
    a link direction indicating downlink or uplink flow associated with each of the backpressure metrics.

2. The method of claim 1, wherein the at least one scheduling metric includes only a maximum back pressure metric for both downlink and uplink traffic served by a particular distributed unit.

3. The method of claim 1, further comprising:
    causing an integrated access and backhaul node to determining whether a link is used for backhaul or access based on the at least one scheduling metric.

4. The method of claim 1, wherein the at least one scheduling metric is one of per flow, per integrated access and backhaul node distributed unit, or per integrated access and backhaul node.

5. The method of claim 1, further comprising:
    implementing a backpressure scheduler based on per user equipment queue information.

6. The method of claim 1, wherein uplink and downlink scheduling are both executed in a parent distributed unit.

7. The method of claim 1, wherein
    the backpressure metric of at least one user equipment flow scheduled by the at least one integrated access and backhaul node distributed unit comprises an identifier of the at least one integrated access and backhaul node distributed unit, a user equipment identifier and a flower identifier.

8. The method of claim 1, wherein the destination queue depth comprises a user equipment identifier, a flow identifier and a size of downlink queue associated with the user equipment identifier and the flow identifier.

9. The method of claim 1, wherein the physical uplink channel is one of a physical uplink control channel, a physical uplink shared channel, wherein the at least one message is sent via at least one of physical layer signaling and media access control layer signaling in the physical uplink shared channel.

10. An apparatus, comprising:
    at least one processor; and
    at least one memory including computer-program code, the at least one memory and the computer-program code configured, with the at least one processor, to cause the apparatus to at least perform:
    receive allocation of a physical uplink channel between at least one integrated access and backhaul node user equipment function and a parent distributed unit; and
    send at least one message via the physical uplink channel, wherein the at least one message includes at least one scheduling metric comprising:
    a destination queue depth scheduled on a downlink by at least one integrated access and backhaul node distributed unit,
    a backpressure metric of at least one user equipment flow scheduled by the at least one integrated access and backhaul node distributed unit,
    a backpressure metric received by the at least one integrated access and backhaul node distributed unit from at least one integrated access and backhaul user equipment function of at least one child integrated access and backhaul node, and
    a link direction indicating downlink or uplink flow associated with each of the backpressure metrics.

11. The apparatus of claim 10, wherein the at least one scheduling metric includes only a maximum back pressure metric for both downlink and uplink traffic served by a particular distributed unit.

12. The apparatus of claim 10, wherein the at least one memory and the computer-program code are further configured, with the at least one processor, to cause the apparatus to perform:
    cause an integrated access and backhaul node to determine whether a link is used for backhaul or access based on the at least one scheduling metric.

13. The apparatus of claim 10, wherein the at least one memory and the computer-program code are further configured, with the at least one processor, to cause the apparatus to perform:

implement a backpressure scheduler based on per user equipment queue information.

14. The apparatus of claim 10, wherein the destination queue depth comprises a user equipment identifier, a flow identifier and a size of downlink queue associated with the user equipment identifier and the flow identifier.

15. A computer program product comprising a non-transitory computer-readable storage medium bearing computer program code embodied therein for use with a computer, the computer program code comprising code for performing:

receiving an allocation of a physical uplink channel between at least one integrated access and backhaul node user equipment function and a parent distributed unit; and sending at least one message via the physical uplink channel, wherein the at least one message includes at least one scheduling metric comprising:

a destination queue depth scheduled on a downlink by at least one integrated access and backhaul node distributed unit, a backpressure metric of at least one user equipment flow scheduled by the at least one integrated access and backhaul node distributed unit, a backpressure metric received by the at least one integrated access and backhaul node distributed unit from at least one integrated access and backhaul user equipment function of at least one child integrated access and backhaul node, and a link direction indicating downlink or uplink flow associated with each of the backpressure metrics.

\* \* \* \* \*